United States Patent Office

3,523,802
Patented Aug. 11, 1970

3,523,802
LIQUID SMOKE COMPOSITION AND METHOD OF MAKING SAME
Robert H. Wandel, Floyd C. Olson, and William J. Parker, Madison, Wis., assignors to Oscar Mayer & Co., Inc., Chicago, Ill., a corporation of Illinois
No Drawing. Filed Jan. 31, 1967, Ser. No. 612,815
Int. Cl. A23b *1/04*
U.S. Cl. 99—229    6 Claims

ABSTRACT OF THE DISCLOSURE

The method of regulating the color of smoked meat products involving the contacting of a meat product to be smoked with a liquid smoke composition which has been treated with a non-toxic oxidizing agent such as a solution of hydrogen peroxide or dehydrogenase enzymes to oxidize the color-forming constituents thereof. The non-toxic oxidizing agents are added to the liquid smoke composition in an amount sufficient to oxidize a portion or all of the color forming constituents thereof and are then preferably heated to accelerate the oxidation reaction. The maximum temperature cannot exceed the temperature at which either the oxidizing agent or liquid smoke composition is adversely effected.

BACKGROUND AND DESCRIPTION OF THE INVENTION

The present invention relates to a new and improved liquid smoke composition, to the use of such composition in the smoking of sausage and other meat products, and to the improved smoked meat products produced therewith. More particularly, this invention is directed to the treatment of liquid smoke compositions with non-toxic oxidizing agents to oxidize the color-forming constituents of such compositions for regulating the color of smoked meat products prepared therewith.

The use of aqueous wood smoke flavored solutions for smoking sausage and other meat products is well known. For example, in U.S. Letters Pat. No. 3,255,689, a liquid smoking apparatus is described wherein linked sausages are continuously conveyed on an endless conveyor through a dispensing device wherein a liquid smoke composition is discharged thereon in a thin film which substantially covers the linked sausages.

These liquid smoke compositions are generally formed by contacting wood smoke with water. In this regard, see U.S. Letters Pat. No. 3,106,473. Typically a batch of wood is burned in the presence of a limited amount of air to form smoke which is then contacted in countercurrent relationship with a stream of water at a controlled temperature for a specific period of time. One such water solution of wood smoke which is commercially available is marketed under the trademark "CharSol."

Liquid smoke compositions when used on meat products such as wiener and smokie links impart to such products desirable flavor and improved hide and skinning characerictis. In this regard, however, it has been found that the extent of treatment required to obtain these advantageous properties often imparts an undesirable brown color to these liquid smoked meat products. The present invention provides a method by which improved flavor and advantageous hide and skinning characteristics can be imparted to wiener and other smoked meat products without incurring undesirable color thereto.

In accordance with the present invention, it has been discovered that smoked meat products, particularly sausages and wieners, having improved flavor and skinning characteristics together with a more desirable light color can be produced by smoking such products with an improved liquid smoke composition in which a portion or all of the color-forming constituent has been oxidized with a non-toxic oxidizing agent such as, for example, hydrogen peroxide or dehydrogenase enzymes. In this regard, it has also been discovered that the lightness of product color is directly related to the extent to which the color-forming constituent of such liquid smoke composition has been oxidized. Accordingly, an important aspect of the present invention concerns itself with the regulation of the color of smoked meat products by varying the oxidizing agent to liquid smoke composition ratio.

It is, therefore, an important object of the present invention to provide an improved liquid smoke composition for smoking meat products, such as wieners and smokie links, for extended periods of time to provide improved flavor and skinning characteristics without imparting undesirable brown color thereto.

Another object of the present invention is to provide a method for regulating the color of smoked meat products produced with liquid smoke compositions.

Another object of the present invention is to provide a method of smoking meat products with liquid smoke compositions for extended periods of time to provide improved flavor and skinning characteristics to such smoked meat products without the resultant dark brown color obtained when such meat products are smoked with conventional liquid smoke compositions for comparable periods of time.

Another object of the present invention is to provide a smoked product which exhibits desirable flavor and advantageous hide and skinning characteristics and an improved and more desirable lighter and redder color.

Other and further objects of the present invention will be apparent from the following detailed description thereof.

One technique for making the improved liquid smoke compositions of the present invention involves first dispersing a non-toxic oxidizing agent in an aqueous smoke flavored solution. The amount of oxidizing agent so used is equal to the stoichiometric quantity needed to oxidize all, or a predetermined part of, the color-forming constituents of the liquid smoke composition. As such, the amount of oxidizing agent needed is dependent upon the oxidizing ability of the particular oxidizing agent as well as the nature and concentration of finished product color-forming entities in the liquid smoke composition. The concentration of oxidizing agent, accordingly, can range from a few parts per million to over 50% of the treated liquid smoke composition.

The preferred oxidizing agents are hydrogen peroxide and dehydrogenase enzymes. In this regard, it has been found that the use of a 30% hydrogen peroxide solution is particularly desirable since the residue of the oxidation reaction produced therewith is water and as such is completely compatible with food products. Other non-toxic oxidizing agents exhibiting properties and characteristics similar to hydrogen peroxide and dehydrogenase enzymes can be used alone or in conjunction therewith in the practice of this invention.

The oxidation reaction between the non-toxic oxidizing agent and the color-forming constituents of the liquid smoke composition is preferably expedited by the application of heat. From a practical standpoint, it is preferred that the temperature of these materials be sufficiently high so as to permit the reaction to complete in a reasonable length of time, e.g. at least 20° C. or higher. In this regard, however, it is to be understood that lower reaction temperatures can be used with longer reaction times to provide suitable liquid smoke compositions. The maximum temperature for the oxidizing agent and liquid smoke composition is the highest temperature at which either of these materials can be subjected without chemical breakdown.

Generally, the time of reaction will vary in accordance with the temperature, activity of the oxidizing agent and reactivity of the color-forming constituents in the liquid smoke composition. Typically, reaction times of one to two hours would be common to assure completion of the reaction, however, shorter or longer times would be appropriate where such was necessary to assure completion of the oxidatiton reaction with the available oxidizing agent.

In the practice of a preferred embodiment of the present invention, typical meat products such as, for example, wieners are made by stuffing a product wiener batter into an elongated casing which is then linked and held in end to end realtionship for advancement by a conveyor to a continuous processing apparatus of the type disclosed in U.S. Letters Patent No. 3,059,272. In this apparatus, the stuffed wiener casings are carried through a series of chambers in which they are smoked, cooked and otherwise processed for marketing. In the smoking chamber, a liquid smoke dispenser of the type disclosed in previously referred to Pat. No. 3,255,689, can be employed to discharge a uniform film-like coating of the treated liquid smoke composition of this invention so that the same substantially covers the entire wiener surface. Alternatively, the wieners can be dipped for a predetermined period of time in a treated liquid smoke composition of this invention. The actual dipping time will be a function of the temperature and concentration of the treated liquid smoke concentratitons. As such, the dipping time can be as low as a fraction of a second to more than ten minutes. Following the contacting of the wieners with the liquid smoke composition, they are then rinsed in cold water and heated to a temperature of around 170° F. The wieners are then skinned and packaged.

It has been found that larger quantities of the liquid smoke compositions of this invention can be applied to meat products for extended periods of time without producing an undesirable dark brown color thereto. In this regard, it has been found that the oxidizing agent reduces the carbonyl and phenol content and increases the acidity of such smoke solutions. This improved color, however, is also accompanied by advantageous skinning characteristics and flavor which have heretofore been unobtainable with smoked meat products of such light color.

The following examples are included herewith for purposes of illustrating the present invention and should not be construed as limiting the scope thereof.

Example 1

3000 ml. of 30% hydrogen peroxide were added to eight gallons of liquid smoke. This mixture was then heated for four hours to complete oxidation. A reel containing 72 links of wiener batter was dipped in the solution for one minute, rinsed and hot-air processed until an internal temperature of 165° F. was achieved. It was observed that the finished wiener smoked in the hydrogen peroxide treated smoke composition had a substantially lighter color than those smoked in an untreated smoke composition using the same procedure.

Example 2

In this test, effective hydrogen peroxide concentrations on wiener color-forming constituents of a liquid smoke composition were tested. Varying amounts of from 1 ml. to 50 ml. of hydrogen peroxide were added to 150 ml. aliquots of CharSol. These samples and a control sample to which no hydrogen peroxide was added were placed on a steam bath for two hours and then held overnight at 32° F. Links of wiener batter were then dipped into each of the samples for a period of 5 minutes and then held for 60 minutes in a Grieve-Hendry oven, Model CR 325, in which the temperature was increased from 150° F. to 200° F. for the first 30 minutes and then maintained at 200°–210° F. for another 30 minutes to finish processing. The wieners were then evaluated for color and skinning ability. Table I below sets forth the results of these tests.

TABLE I.—COLOR AND SKINNING EVALUATION OF WIENERS SMOKED IN HYDROGEN PEROXIDE TREATED SMOKE SOLUTIONS

| Mls. of 30% hydrogen peroxide added to 150 mls. of CharSol | Percent hydrogen peroxide in CharSol before oxidation | Skinning evaluation | Munsell color value |
|---|---|---|---|
| None (control) | 0.0 | Excellent | 2.5 YR 4.5/6. |
| 1 ml. | 0.2 | Very good | 2.5 YR 4.75/6.5. |
| 2.5 mls. | 0.5 | do | 2.5 YR 5.25/6. |
| 5.0 mls. | 1.0 | Good | 2.5 YR 5.5/7. |
| 7.5 mls. | 1.5 | do | 2.5 YR 6/6. |
| 10.0 mls. | 2.0 | do | 2.5 YR 6.25/6. |
| 12.5 mls. | 2.5 | Fair-good | 2.5 YR 7/6. |
| 15.0 mls. | 3.0 | do | 5.0 YR 7/5. |
| 20.0 mls. | 4.0 | Fair | Unacceptable appearance [1] |
| 50.0 mls. | 10.0 | do | Do.[1] |

[1] Excess of hydrogen peroxide present in smoke solution which bleached and shriveled the wiener surface to produce an unacceptable appearance. No Munsell values were observed.

As the above data indicate, a pronounced lightening of wiener color was produced with increased concentrations of hydrogen peroxide. It was observed, however, that when the conceneration of hydrogen peroxide contained in the sample was 4.0 or more percent that the excess hydrogen peroxide had an adverse effect on the wiener.

Example 3

In this example, the effect of peroxide concentration and heat treatment of CharSol smoke solutions were studied. Four equally sized samples of CharSol were used. To three of these samples, varying amounts of hydrogen peroxide were added to respectively provide a 3% hydrogen peroxide CharSol sample, a 1.5% hydrogen peroxide CharSol sample, and a 0.75% hydrogen peroxide CharSol sample. No hydrogen peroxide was added to the fourth sample in order that it be used as a control. Each of the first three samples to which varying amounts of hydrogen peroxide were added were then divided into equally sized lots, the first of which was heated for four hours on the steam bath, the second of which was heated for 24 hours in a steam bath and the third of which was concentrated to half its volume and rediluted back to its original volume. The control sample was divided into four equally sized lots, the first three of which were respectively treated in the same manner as each of the lots for the hydrogen peroxide containing CharSol and the fourth lot was given no treatment at all.

After treatment in accordance with the above described procedure, wiener batter links were dipped into all samples for a period of 5 minutes at 150° F., rinsed and then processed in a Grieve-Hendry oven maintained at a temperature of 150° F. for 5 minutes followed by a gradual increase in temperature to 200° F. over the first 30 minutes and then maintained at 200–210° F. for another 30 minutes. The finished links were then evaluated for color by comparing them with Munsell color charts. All of the smoke samples were then analyzed for pH, titratable acidity, phenol and carbonyl content. Also, the amount of residue on drying was ascertained. The results obtained are set forth below in Tables II and III.

TABLE II.—EFFECT OF VARYING THE HYDROGEN PEROXIDE CONCENTRATION IN CHARSOL ON FINISHED PRODUCT COLOR AND CHEMICAL COMPOSITION OF THE SMOKE SOLUTION

| Hydrogen peroxide concentration in smoke solution, percent | Avg. Munsell color values of finished wieners | Chemical properties of smoke solution | | | | |
|---|---|---|---|---|---|---|
| | | Avg. pH | Avg. percent acid as acetic | Avg. percent phenols as phenol | Avg. percent carbonyls as 2-butanone | Avg. percent residue on drying |
| 3 | 2.5 YR 6.5/6 | 2.09 | 7.8 | 0.15 | 2.9 | 5.9 |
| 1.5 | 2.5 YR 5.5/6 | 2.21 | 6.8 | 0.20 | 3.9 | 6.0 |
| 0.75 | 2.5 YR 5.25/6 | 2.33 | 6.1 | 0.24 | 4.6 | 6.1 |
| 0.0 | 2.5 YR 4.0/7.25 | 2.45 | 5.1 | 0.27 | 5.6 | 6.3 |

TABLE III.—SIGNIFICANT EFFECTS OF HEAT TREATMENT AND CONCENTRATION ON THE CHEMICAL PROPERTIES OF SMOKE SOLUTIONS TREATED WITH HYDROGEN PEROXIDE

| Heat treatment | Hydrogen peroxide [1] treated samples | | | Untreated control samples | | |
|---|---|---|---|---|---|---|
| | Avg. pH | Avg. percent acid as acetic | Avg. percent carbonyl as 2-butanone | Avg. pH | Avg. percent acid as acetic | Avg. percent carbonyl as 2-butanone |
| Heated 4 hrs | 2.19 | 7.4 | 4.1 | 2.44 | 5.4 | 6.2 |
| Heated 24 hrs | 2.17 | 7.5 | 3.8 | 2.45 | 5.4 | 5.6 |
| Conc. to ½ vol | 2.27 | 5.8 | 3.6 | 2.49 | 4.1 | 4.3 |
| None | | | | 2.38 | 5.6 | 6.6 |

[1] Percentage acid and carbonyl values based on arithmetic average obtained with 3%, 1.5% and 0.75% hydrogen peroxide treated smoke solutions.

As the data of Table II indicate, an increase in the hydrogen peroxide concentration brings about a pronounced lightening effect in the color of finished wieners together with a reduction in pH, phenol concentration, carbonyl concentration and the amount of residue left on drying. At the same time, an increase in hydrogen peroxide concentration in smoke solution was noted to produce a corresponding increase in the acidity thereof. The pH decreased because of the oxidation of the carbonyl and other incompletely oxidized organic compounds to organic acids. About 50% of the phenols were destroyed by the peroxide. It was also observed that the hydrogen peroxide concentration had a greater effect on the character of the smoke solution and the color of wieners than did variations in the heat treatment of such sample lots.

As the data of Table III indicate, heating did not have a significant effect on the chemical properties of the peroxide treated or untreated smoke solutions except that it resulted in a reduction of carbonyl content. Concentrating the solution to half its volume, however, reduced the acid and carbonyl content significantly. Accordingly, this test verifies that the excess acid content of a peroxide treated smoke solution can be reduced by this technique. It was noted that even though a reduction in carbonyl content occurred, no significant lightening of wiener color due to heating was observed.

In the foregoing specification a detailed description of the present invention has been fully set forth. It will, however, be apparent to those skilled in the art that modifications and variations may be made therefrom without departing from the spirit and scope of this invention which is to be limited only by the following claims.

We claim:

1. An improved liquid smoke composition adapted for producing smoked meat products having a desirable light color, said composition comprising an aqueous smoke flavored solution and up to 50%, by weight, of a non-toxic oxidizing agent selected from the group consisting of hydrogen peroxide and dehydrogenase enzymes, said amount of oxidizing agent being based on the total weight of said composition whereby said amount of oxidizing agent is sufficient to oxidize a predetermined portion of the color-forming constituent of said smoke flavored solution.

2. The improved liquid smoke composition of claim 1 wherein said non-toxic oxidizing agent is hydrogen peroxide.

3. The improved liquid smoke composition of claim 1 wherein said non-toxic oxidizing agent is dehydrogenase enzymes.

4. The method of making an improved liquid smoke composition adapted for producing smoked meat products of improved flavor and color, said method comprising combining up to approximately 50%, by weight, of a non-toxic oxidizing agent selected from the group consisting of hydrogen peroxide and dehydrogenase enzymes with an aqueous smoke flavored solution, said amount of oxidizing agent being based on the total weight of said composition whereby said amount of oxidizing agent is sufficient to oxidize a predetermined portion of the color-forming constituent of said smoke flavoured solution.

5. The method of claim 4 wherein said non-toxic oxidizing agent is hydrogen peroxide.

6. The method of claim 4 wherein said non-toxic oxidizing agent is dehydrogenase enzymes.

References Cited

UNITED STATES PATENTS 3,052,551  9/1962  Hogan _____ 99—107
3,106,473  10/1963  Hollenbeck _____ 99—229

OTHER REFERENCES

Sumner et al., "The Enzymes," 1950, published by Academic Press Inc., New York, page 6.

Rose et al., "The Condensed Chemical Dictionary," 1956, published by Reinhold Publishing Corp., New York, p. 1006, article entitled Sodium Nitrate.

HYMAN LORD, Primary Examiner